United States Patent [19]

Sprayberry

[11] Patent Number: 5,593,145
[45] Date of Patent: Jan. 14, 1997

[54] SHEET MATERIAL HOLDING TOOL

[76] Inventor: Barry S. Sprayberry, 124 Julie La., Stockbridge, Ga. 30281

[21] Appl. No.: 395,118

[22] Filed: Feb. 27, 1995

[51] Int. Cl.⁶ ..................................................... B25B 11/00
[52] U.S. Cl. .................. 269/3; 269/21; 269/909; 224/264; 224/265
[58] Field of Search ................................. 224/149, 185, 224/201, 265, 264, 907; 294/64.1, 65; 414/11; 248/363, 362, 352; 269/3, 21, 909

[56] References Cited

U.S. PATENT DOCUMENTS

| 3,039,765 | 6/1962 | Tate | 269/3 |
|---|---|---|---|
| 3,116,919 | 1/1964 | Alth | 269/21 |
| 3,934,769 | 1/1976 | Carlson | 224/201 |
| 4,083,480 | 4/1978 | Lee et al. | 224/185 |
| 4,244,500 | 1/1981 | Fournier | 224/265 |
| 4,483,070 | 11/1984 | Junkermann | 224/185 |
| 4,608,967 | 9/1986 | Piro | 269/3 |
| 4,895,286 | 1/1990 | DeRosa | 224/265 |
| 4,963,904 | 10/1990 | Lee | 224/265 |
| 4,967,943 | 11/1990 | Massey | 224/264 |
| 4,998,711 | 3/1991 | Borg | 269/21 |

Primary Examiner—Robert C. Watson
Attorney, Agent, or Firm—James B. Middleton

[57] ABSTRACT

A tool for supporting material, such as an automobile windshield, from the body of a worker has a plate shaped to fit on the shoulder of the worker, a shank fixed to the plate, and a suction cup receivable on the shank and fixable to the glass. The plate is padded for comfort of the worker. The shank is replaceable so the length of the shank can be selected to suit the worker and the task. The plate is formed of a thermoplastic, and can be vacuum formed with a boss. A coupling, then, fits over the boss and provides a socket to receive the shank. If required, a reinforcing plug can be received within the boss.

10 Claims, 1 Drawing Sheet

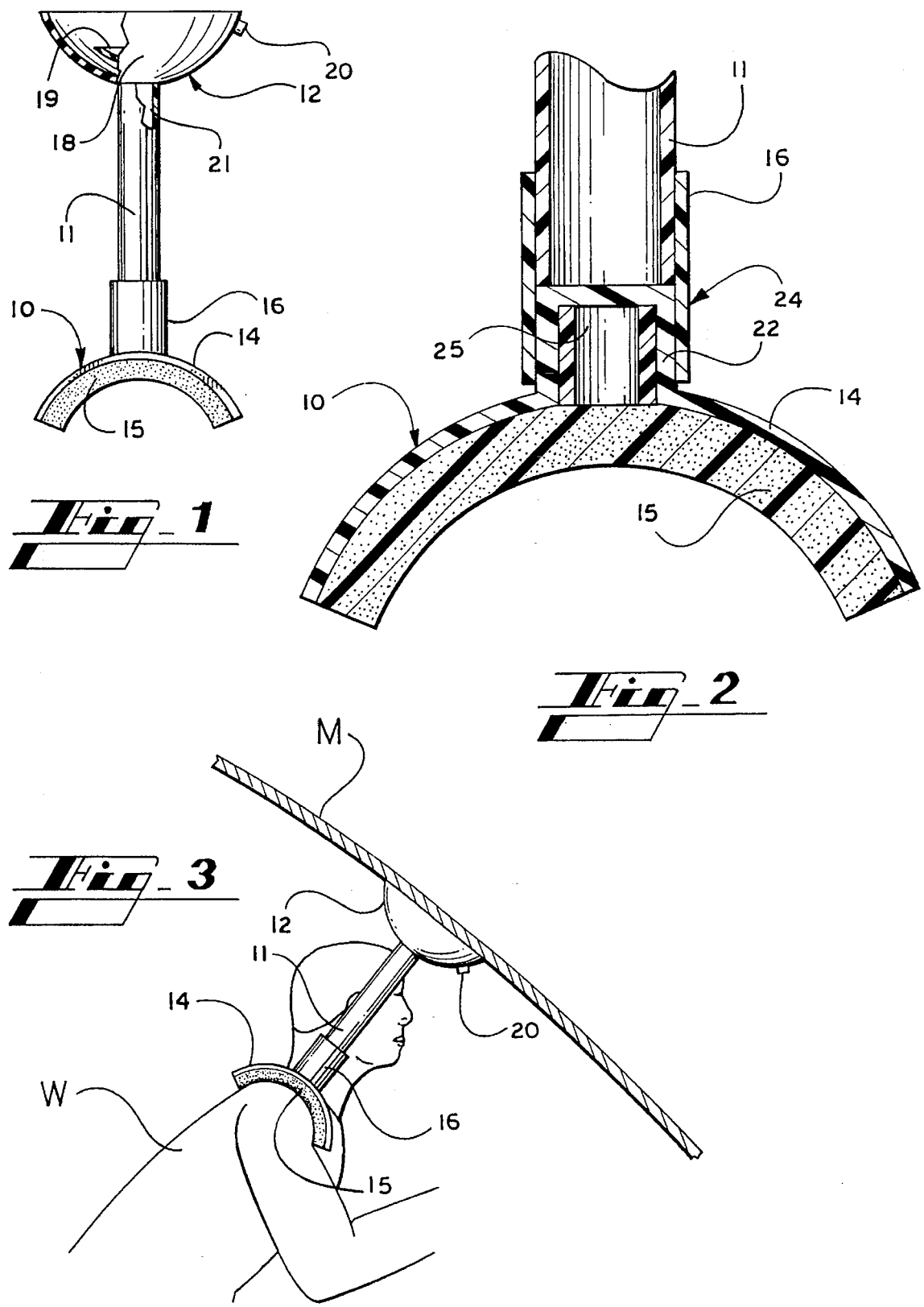

5,593,145

SHEET MATERIAL HOLDING TOOL

BACKGROUND OF THE INVENTION

1. Field of the Invention

This invention relates generally to tools and the like, and is more particularly concerned with a tool for use by a person to hold sheet material or the like.

2. Discussion of the Prior Art

There are many situations in which a person must hold a sheet, or plate, of material while accomplishing some task in connection therewith. When both hands are required for the task, some additional means must be provided to hold the material. Obviously an additional person could hold the material, but this significantly adds to the labor cost. Also, there are situations in which there is simply no room for an additional person. In either case, the one worker usually attempts to hold the material with some other body part. Depending on the particular arrangement, the worker may use a shoulder, or part of his back, or his head. Regardless of the body part used, the worker is required to be something of a contortionist. Also, the material is frequently heavy enough that the worker may be in pain while holding the material, and may have a painful bruise even when the work is done.

One industry wherein a worker is typically required to hold material with a body part is automobile glass installation. When removing a windshield, for example, a worker must support the glass with his head while cutting the edges of the glass loose. This means the worker cannot move his head as may be needed to see various portions of the work. Also, of course, glass is quite heavy, and the head does not have any appreciable muscle or fat for padding. In spite of these difficulties, however, the standard in the industry is to support the glass with one's head.

SUMMARY OF THE INVENTION

The present invention provides a tool having one end supported on a worker's shoulder, the opposite end of the tool having means for temporarily fixing the tool to the material to be held. The length of the tool is such that the worker's hands will reach the area of the task to be performed while the material is supported from the worker's shoulder.

In one embodiment of the invention, the tool is designed for an automobile glass worker, and the means for temporarily fixing the tool to the material is a suction cup of a type conventionally used by such workers. The tool of the present invention readily receives the suction cup on one end; and, the opposite end of the tool comprises a padded base shaped to be received over the particular body part, such as a shoulder.

Since the suction cup is flexible, the worker can move his body with respect to the suction cup without reducing the support for the material. The worker is therefore free to perform the task at hand while continuing to support the material.

BRIEF DESCRIPTION OF THE DRAWINGS

These and other features and advantages of the present invention will become apparent from consideration of the following specification when taken in conjunction with the accompanying drawings in which:

FIG. 1 is a side elevational view of a tool made in accordance with the present invention;

FIG. 2 is an enlarged, diametrical cross-sectional view through the lower end of the tool shown in FIG. 1; and, FIG. 3 is a side elevational view of the tool of FIG. 1 shown as it may be used by a worker.

DETAILED DESCRIPTION OF AN EMBODIMENT

Referring now more particularly to the drawings, and to that embodiment of the invention here presented by way of illustration, the tool shown in FIG. 1 includes a body engaging means 10 which mounts a shank 11, the shank 11 receiving material engaging means 12. The body engaging means 10 constitutes a base for the tool, the base comprising a substantially rigid plate 14 having padding 15 fixed thereto. On the side of the plate 14 opposite from the padding 15, there is a socket 16 for receiving the shank 11.

Those skilled in the art will understand that automobile glass workers conventionally utilize a suction cup of the type shown in FIG. 1 as the material engaging means 12. The suction cup includes a first suction cup 18 and an inner, smaller, suction cup 19. The two suction cups provide excellent holding power; and, the suction can be released by pulling on the release tab 20. The suction cup 18 is provided with a handle 21 which is normally used for manipulating the suction cup; but, in the combination of the present invention, the handle 21 extends into the hollow center of the shank 11 to hold the material engaging means 12 to the shank 11. Those skilled in the art will understand the suction cup and its construction without further discussion.

Attention is directed to FIG. 2 of the drawings for a more detailed discussion of the construction of the tool of the present invention. First, it will be understood that the plate 14 is generally cylindrical, or hemi-cylindrical, and is here shown as formed of a thermoplastic material. Though the plate 14 may be shaped by many different techniques, it has been found that vacuum forming is economical and efficient. After vacuum forming of the plate 14, the padding 15 is put into place. In one successful embodiment of the invention, a polyurethane foam is glued in place; however, those skilled in the art will realize that the padding could be foamed in place, welded ultrasonically or otherwise fixed to the plate 14. Further, an expanded vinyl, or polyethylene or the like may be used as the padding.

In order to form the socket 16, a boss 22 is provided on the plate 14. The boss 22 is provided during the vacuum forming of the plate 14 so the boss 22 is integral with the plate 14, and is here shown as circular to receive a conventional pipe coupling 24 thereover. One end of the coupling 24 can be glued, sonically welded or otherwise fixed to the boss 22, defining the socket 16 at the opposite end of the coupling.

With the construction described above, it will be understood that the shank 11 can be selectively inserted into and removed from the socket 16; and, the suction cup 12 can be selectively inserted into and removed from the opposite end of the shank 11. As a result, one can easily vary the length of the shank 11 to fit the particular person and/or the particular task to be accomplished.

The construction of the plate 14 and the boss 22 as described above will be sufficiently sturdy for most purposes, but if additional strength is needed one can add the reinforcing plug as shown in FIG. 2 at 25. The plug 25 may be simply a length of plastic pipe of the appropriate length and diameter to fit within the boss 22. The plug is then placed into the hollow center of the boss 22 while the thermoplastic material of the plate 14 is still warm enough to be in a plastic state. The plug will therefore become almost integral with the boss 22, the degree of welding depending on the relative melt indexes of the two materials.

With the foregoing discussion in mind, attention is directed to FIG. 3 of the drawings for a full understanding of the use of the invention. FIG. 3 illustrates a worker W adjacent to a piece of material M such as an automobile windshield. The tool of the present invention has the base, or body engaging means 10 resting on the shoulder of the worker W, with the suction cup, or material engaging means 12 in contact with the glass, or material M. It will be understood by those skilled in the art that the suction cup 18 will be somewhat flattened as it becomes attached to the glass; then, the suction cup 18 will remain fixed to the glass during considerable motion of the handle 21 in the shank 11. Thus, the worker W can select the proper shank 11 to suit himself and the task, then place the base 10 on his shoulder and the suction cup 18 against the glass M. The worker can then move about to some extent, the rubber suction cup allowing pivotal motion of the shank 11 with respect to the material M. The worker's head is also free to move about, so the worker can turn his head to look at the work being performed.

The tool of the present invention therefore provides a simple and effective means for supporting material from the body of a worker working with the material. While the embodiment of the invention here presented is for use with automobile glass, it will be recognized that the tool is readily adaptable to other tasks merely by changing the shape of the base, the length of the shank, and the material engaging means.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A tool for supporting sheet material from the body of a worker, said tool comprising body engaging means for engaging a shoulder of the worker, a shank mounted on said body engaging means, and a material engaging means carried by said shank, said body engaging means comprising a rigid plate shaped to fit said shoulder of the worker, and padding fixed to said rigid plate between said shoulder and said plate, said material engaging means comprising means to prevent slipping between said shank and said sheet material.

2. A tool as claimed in claim 1, said body engaging means further including socket means for selectively receiving said shank.

3. A tool as claimed in claim 1, wherein said sheet material consists of an automobile windshield, and said means to prevent slipping consists of a suction cup.

4. A tool as claimed in claim 3, wherein said shank is removably fixed to said plate and to said suction cup so that shanks of various lengths can be used with said tool.

5. A tool for supporting material from the body of a worker, said tool comprising body engaging means for engaging a portion of the body of the worker, a shank mounted on said body engaging means, and a material engaging means carried by said shank, said body engaging means comprising a plate shaped to fit said portion of the body of the worker, and padding fixed to said plate between said portion of the body and said plate, said body engaging means further including socket means for selectively receiving said shank, said body engaging means including a boss on said plate, and a coupling receiving said boss and fixed thereto so that said coupling defines said socket means.

6. A tool for supporting material from the body of a worker, said tool comprising body engaging means for engaging a portion of the body of the worker, a shank mounted on said body engaging means, and a material engaging means carried by said shank, said body engaging means comprising a plate shaped to fit said portion of the body of the worker, and padding fixed to said plate between said portion of the body and said plate, wherein said material consists of glass, said material engaging means comprises a suction cup having a handle thereon, and said portion of the body consists of the shoulder of the worker, said plate being hemi-cylindrical in form to fit the shoulder of the worker, said padding being on the concave surface of said plate.

7. A tool as claimed in claim 6, said plate further including socket means for selectively receiving said shank.

8. A tool as claimed in claim 7, said body engaging means including a boss on said plate, and a coupling receiving said boss and fixed thereto so that said coupling defines said socket means.

9. A tool as claimed in claim 8, wherein said shank defines a central opening, said handle of said suction cup being received within said central opening for carrying said suction cup on said shank.

10. A tool as claimed in claim 9, and further including a reinforcing plug received within said boss and fixed thereto.

* * * * *